US012529107B2

(12) United States Patent
Langevin et al.

(10) Patent No.: US 12,529,107 B2
(45) Date of Patent: Jan. 20, 2026

(54) CpG ISLAND METHYLATION PROFILE IN NON-INVASIVE ORAL RINSE SAMPLES FOR DETECTION OF ORAL AND PHARYNGEAL CARCINOMA (71) Applicant: University Of Cincinnati, Cincinnati, OH (US)

(72) Inventors: Scott M. Langevin, Cincinnati, OH (US); Karl T. Kelsey, Providence, RI (US)

(73) Assignee: University of Cincinnati, Cincinnati, OH (US)

( * ) Notice: Subject to any disclaimer, the term of this patent is extended or adjusted under 35 U.S.C. 154(b) by 0 days.

(21) Appl. No.: 15/806,148

(22) Filed: Nov. 7, 2017

(65) Prior Publication Data
US 2018/0208992 A1    Jul. 26, 2018

Related U.S. Application Data (60) Provisional application No. 62/418,339, filed on Nov. 7, 2016.

(51) Int. Cl.
*C12Q 1/68* (2018.01)
*C07H 21/04* (2006.01)
*C12Q 1/6886* (2018.01)

(52) U.S. Cl.
CPC ..... *C12Q 1/6886* (2013.01); *C12Q 2600/106* (2013.01); *C12Q 2600/154* (2013.01)

(58) Field of Classification Search
None
See application file for complete search history.

(56) References Cited

U.S. PATENT DOCUMENTS

| 8,546,078 | B2 | 10/2013 | Freije et al. |
| 2010/0151468 | A1 | 6/2010 | Esteller et al. |
| 2011/0028333 | A1 | 2/2011 | Christensen et al. |
| 2015/0126374 | A1* | 5/2015 | Califano ............... C12Q 1/6886 506/2 |

FOREIGN PATENT DOCUMENTS

WO    20090115313 A1    9/2009

OTHER PUBLICATIONS

Langevin et al. (Clinical Epigenetics, vol. 7, No. 125, Dec. 3, 2015 (Year: 2015).*
Langevin et al. (Oral Oncology, vol. 50, pp. 1071080, 2014) (Year: 2014).*
Teh et al. (Epigenetics, vol. 11, No. 1, Feb. 22, 2016). (Year: 2016).*
Wang et al. (Epigenetics, vol. 10, No. 7, pp. 662-669, Jul. 2015) (Year: 2015).*
Siegel T, Ma J, Zou A, et al: Cancer statistics, 2014. CA Cancer J Clin 64:9-29, 2014.
Ferlay J, Soerjomataram I, Ervick M, et al: GLOBOCAN 2012 v1.0, Cancer Incidence and Mortality Worldwide: IARC Cancer Base No. 11 [Internet], Lyon, France, International Agency for Research on Cancer, 2013.
Argiris A, Karamouzis MV, Raben D, et al: Head and neck cancer, Lancet 371:1695-709, 2008.
Altekruse SF, Kosary CL, Krapcho M, et al: SEER Cancer Statistics Review, 1975-2007. Bethesda, MD, National Cancer Institute, 2010.
Esteller M: Epigenetics in cancer. N Engl J Med 358:1148-59, 2008.
Tost J: DNA methylation: an introduction to the biology and the disease-associated changes of a promising biomarker. Mol Biotechnol 44:71-81, 2010.
Kulis M, Queiros AC, Beekman R, et al: Intragenic DNA methylation in transcriptional regulation, normal differentiation and cancer. Biochim Biophys Acta 1829:1161-74, 2013.
Baylin SB, Jones PA: A decade of exploring the cancer epigenome—biological and translational implications. Nat Rev Cancer 11:726-34, 2011.
Kulis M, Heath S, Bibikova M, et al: Epigenomic analysis detects widespread gene-body DNA hypomethylation in chronic lymphocytic leukemia. Nat Genet 44:1236-42, 2012.
Eckhardt F, Lewin J, Cortese R, et al: DNA methylation profiling of human chromosomes 6, 20 and 22. Nat Genet 38:1378-85, 2006.
Illingworth R, Kerr A, Desousa D, et al: A novel CpG island set identifies tissue-specific methylation at developmental gene loci. PLoSBiol 6:e22, 2008.
Rakyan VK, Down TA, Thorne NP, et al: An integrated resource for genome-wide identification and analysis of human issue-specific differentially methylated regions (tDMRs). Genome Res 18:1518-29, 2008.
Rakyan VK, Hildmann T, Novik KL, et al: DNA methylation profiling of the human major histocompatibility complex: a pilot study for the human epigenome project. PLoSBiol 2:e405, 2004.
Schilling E, Rehli M: Global, comparative analysis of tissue-specific promoter CpG methylation. Genomics 90:314-23, 2007.
Demokan S, Chang X, Chuang A, et al: KIF1A and EDNRB are differentially methylated in primary HNSCC and salivary rinses. Int J Cancer 127:2351-9, 2010.

(Continued)

*Primary Examiner* — Jeanine A Goldberg
(74) *Attorney, Agent, or Firm* — Wood Herron & Evans LLP (57) ABSTRACT There are currently no screening tests in routine use for oral and pharyngeal cancer beyond visual inspection and palpation. Described is an improve method of detecting oral and pharyngeal cancer with a saliva sample from a subject. The method includes identifying the presence or absence of a methylation classifier in the saliva the sample. The methylation classifier is determined by the methylation status of a panel of CpG islands in the sample. In an embodiment, the methylation classifier is determined by the methylation status of between 15 and 25 CpG islands, or alternatively, 22 CpG islands. The presence of the methylation classifier indicates a diagnosis of cancer in the subject. In an embodiment, the presence of the methylation classifier is determined with a bisulfite method of determining methylation status of the CpG islands.

6 Claims, 12 Drawing Sheets

(56) References Cited

OTHER PUBLICATIONS

Nagata S, Hamada T, Yamada N, et al: Aberrant DNA methylation of tumor-related genes in oral rinse: a noninvasive method for detection of oral squamous cell carcinoma. Cancer 118:4298-308, 2012.
Ovchinnikov DA, Cooper MA, Pandit P, et al: Tumor-suppressor Gene Promoter Hypermethylation in Saliva of Head and Neck Cancer Patients. Transl Oncol 5:321-6, 2012.
Ovchinnikov DA, Wan Y, Coman WB, et al: DNA Methylation at the Novel CpG Sites in the Promoter of MED15/PCQAP Gene as a Biomarker for Head and Neck Cancers. Biomark Insights 9:53-60, 2014.
Pattani KM, Zhang Z, Demokan S, et al: Endothelin receptor type B gene promoter hypermethylation in salivary rinses is independently associated with risk of oral cavity cancer and premalignancy. Cancer Prev Res (Phila) 3:1093-103, 2010.
Righini CA, de Fraipont F, Timsit JF, et al: Tumor-specific methylation in saliva: a promising biomarker for early detection of head and neck cancer recurrence. Clin Cancer Res 13:1179-85, 2007.
Rosas SL, Koch W, da Costa Carvalho MG, et al: Promoter hypermethylation patterns of p16, 06-methylguanine-DNA-methyltransferase, and death-associated protein kinase in tumors and saliva of head and neck cancer patients. Cancer Res 61:939-42, 2001.
Viet CT, Schmidt BL: Methylation array analysis of preoperative and postoperative saliva DNA in oral cancer patients. Cancer Epidemiol Biomarkers Prev 17:3603-11, 2008.
Schussel J, Zhou XC, Zhang Z, et al: EDNRB and DCC salivary rinse hypermethylation has a similar performance as expert clinical examination in discrimination of oral cancer/dysplasia versus benign lesions. Clin Cancer Res 19:3268-75, 2013.
Guerrero-Preston R, Soudry E, Acero J, et al: NID2 and HOXA9 promoter hypermethylation as biomarkers for prevention and early detection in oral cavity squamous cell carcinoma tissues and saliva. Cancer Prev Res (Phila) 4:1061-72, 2011.
Carvalho AL, Jeronimo C, Kim MM, et al: Evaluation of promoter hypermethylation detection in body fluids as a screening/diagnosis tool for head and neck squamous cell carcinoma. Clin Cancer Res 14:97-107, 2008.
Langevin SM, Butler RA, Eliot M, et al: Novel DNA methylation targets in oral rinse samples predict survival of patients with oral squamous cell carcinoma. Oral Oncol 50:1072-80, 2014.
Langevin SM, Stone RA, Bunker CH, et al: MicroRNA-137 promoter methylation in oral rinses from patients with squamous cell carcinoma of the head and neck is associated with gender and body mass index. Carcinogenesis 31:864-70, 2010.
Robinson MD, Kahraman A, Law CW, et al: Statistical methods for detecting differentially methylated loci and regions. Front Genet 5:324, 2014.
Langevin SM, Michaud DS, Marsit CJ, et al: Gastric reflux is an independent risk factor for laryngopharyngeal carcinoma. Cancer Epidemiol Biomarkers Prey 22:1061-8, 2013.
Michaud DS, Langevin SM, Eliot M, et al: High-risk HPV types and head and neck cancer. Int J Cancer 135:1653-61, 2014.
Bohlke K, Harlow BL, Cramer DW, et al: Evaluation of a population roster as a source of population controls: the Massachusetts Resident Lists. Am J Epidemiol 150:354-8, 1999.
Assenov Y, Muller F, Lutsik P, et al: Comprehensive analysis of DNA methylation data with RnBeads. Nat Methods 11:1138-40, 2014.
Fortin JP, Labbe A, Lemire M, et al: Functional normalization of 450k methylation array data improves replication in large cancer studies. Genome Biol 15:503, 2014.
Triche TJ, Jr., Weisenberger DJ, Van Den Berg D, et al: Low-level processing of Illumina Infinium DNA Methylation BeadArrays. Nucleic Acids Res 41:e90, 2013.
Leek JT, Johnson WE, Parker HS, et al: The sva package for removing batch effects and other unwanted variation in high-throughput experiments. Bioinformatics 28:882-3, 2012.
Hsieh F, Chen SC, Pollard K: A nearly exhaustive search for CpG islands on whole chromosomes. Int J Biostat 5, 2009.
Koestler DC, Marsit CJ, Christensen BC, et al: Semi-supervised recursively partitioned mixture models for identifying cancer subtypes. Bioinformatics 26:2578-85, 2010.
Bair E, Tibshirani R: Semi-supervised methods to predict patient survival from gene expression data. PLoS Biol 2: E108, 2004.
Bair E, Hastie T, D P, et al: Prediction by supervised principal components. Journal of the American Statistical Association 101:119-137, 2006.
Houseman EA, Christensen BC, Yeh RF, et al: Model-based clustering of DNA methylation array data: a recursive-partitioning algorithm for high-dimensional data arising as a mixture of beta distributions. BMC Bioinformatics 9:365, 2008.
Benjamini Y, Hochberg Y: Controlling the false discovery rate: a practical and powerful approach to multiple testing. Journal of the Royal Statistical Society Series B-Statistical Methodology 29:11651188, 1995.
Paluszczak J, Sarbak J, Kostrzewska-Poczekaj M, et al: The negative regulators of Wnt pathway-DACH1, DKK1, and WIF1 are methylated in oral and oropharyngeal cancer and WIF1 methylation predicts shorter survival. Tumour Biol 36:2855-61, 2015.
Paluszczak J, Hemmerling D, Kostrzewska-Poczekaj M, et al: Frequent hypermethylation of WNT pathway genes in laryngeal squamous cell carcinomas. J Oral Pathol Med 43:652-7, 2014.
Ogoshi K, Kasamatsu A, Iyoda M, et al: Dickkopf-1 in human oral cancer. Int J Oncol 39:329-36, 2011.
Gosepath EM, Eckstein N, Hamacher A et al: Acquired cisplatin resistance in the head-neck cancer cell line Cal27 is associated with decreased DKK1 expression and can partially be reserved by overexpression of DKK1. Int J Cancer 123:2013-9, 2008.
Katase N, Lefeuvre M, Gunduz M, et al: Absence of Dickkopf (Dkk)-3 protein expression is correlated with longer disease-free survival and lower incidence of metastasis in head and neck squamous cell carcinoma. Oncol Lett 3:273-280, 2012.
Shi Y, Gong HL, Zhou L, et al: Dickkopf-1 is a novel prognostic biomarker for laryngeal squamous cell carcinoma. Acta Otolaryngol 134:753-9, 2014.
Wang KS, Liu X, Zhang Q, et al: ANAPC1 and SLCO3A1 are associated with nicotine dependence: meta-analysis of genome-wide association studies. Drug Alcohol Depend 124:325-32, 2012.
Jeggari A, Marks DS, Larsson E: miRcode: a map of putative microRNA target sites in the long non-coding transcriptome. Bioinformatics 28:2062-3, 2012.
Langevin SM, Kelsey KT: The fate is not always written in the genes: epigenomics in epidemiologic studies. Environ Mol Mutagen 54:533-41, 2013.
Michels KB, Binder AM, Dedeurwaerder S, et al: Recommendations for the design and analysis of epigenome-wide association studies. Nat Methods 10:949-55, 2013.
Raykan VK, Down TA, Balding DJ, et al: Epigenome-wide association for common human diseases. Nat Rev Genet 12:529-41, 2011.
Ha PJ, Califano JA: Promoter methylation and inactivation of tumour-suppressor genes in oral squamous-cell carcinoma. Lancet Oncol 7:77-82; 2006.

* cited by examiner

FIG. 1

Characteristics of study subjects in the *Training* and *Testing* sets according to case-control status for oral and pharyngeal carcinoma.

| | Training Set (N = 147) | | | Testing Set (N = 76) | | |
|---|---|---|---|---|---|---|
| | Case (n = 101) | Control (n = 46) | $P_{difference}$ | Case (n = 51) | Control (n = 25) | $P_{difference}$ |
| Age, median (range) | 60.0 (23-86) | 60.5 (46-88) | 0.31[e] | 58.0 (29-78) | 59.0 (32-77) | 0.82[e] |
| Sex | | | | | | |
| Female | 29 (28.7%) | 17 (37.0%) | 0.34[f] | 16 (31.4%) | 8 (32.0%) | >0.99[f] |
| Male | 72 (71.3%) | 29 (63.0%) | | 35 (68.6%) | 17 (68.0%) | |
| Race[a] | | | | | | |
| White | 92 (91.1%) | 44 (95.7%) | 0.51[f] | 47 (92.2%) | 20 (80.0%) | 0.15[f] |
| Other | 8 (7.9%) | 2 (4.3%) | | 4 (7.8%) | 5 (20.0%) | |
| Smoking[b] | | | | | | |
| Never | 30 (31.3%) | 15 (32.6%) | >0.99[f] | 15 (31.3%) | 14 (56.0%) | 0.048[f] |
| Ever | 66 (68.8%) | 31 (67.4%) | | 33 (68.8%) | 11 (44.0%) | |
| Pack-years[c], median (range) | 31.0 (0.6-120) | 24.0 (0.1-200) | 0.18[e] | 22.0 (0.9-94) | 13.7 (0.8-62.5) | 0.23[e] |
| Alcohol use[b] | | | | | | |
| Non-drinker | 7 (7.4%) | 7 (15.2%) | 0.18[f] | 3 (6.3%) | 4 (16.0%) | 0.047[f] |
| ≤ 2 drinks/day | 51 (53.7%) | 27 (58.7%) | | 25 (52.1%) | 17 (68.0%) | |
| > 2 drinks/day | 37 (38.9%) | 12 (26.1%) | | 20 (41.7%) | 4 (16.0%) | |
| HPV Serology[d] (L1 antibodies) | | | | | | |
| Negative | 74 (76.3%) | 42 (95.5%) | 0.004[f] | 35 (76.1%) | 22 (91.7%) | 0.19[f] |
| Positive | 23 (23.7%) | 2 (4.5%) | | 11 (23.9%) | 2 (8.3%) | |
| AJCC Stage Group | | | | | | |
| I | 24 (23.8%) | --- | --- | 13 (25.5%) | --- | --- |
| II | 12 (11.9%) | --- | | 7 (13.7%) | --- | |
| III | 13 (12.9%) | --- | | 5 (9.8%) | --- | |
| IV | 52 (51.5%) | --- | | 26 (51.0%) | --- | |

FIG. 2

Footnotes:
[a] Race data was missing for 1 case in the *Training* set
[b] Smoking and alcohol data was missing for 5 cases in the *Training* set and 3 cases in the *Testing* set
[c] Restricted to ever-smokers
[d] HPV16 L1 serology was missing for 4 cases and 4 controls in the *Training* set and 5 cases and 1 control in the *Testing* set
[e] Wilcoxon rank-sum test
[f] Fisher's exact test

| M | CpG Island Coordinates[b] | Associated Gene (ncRNA) | CpG Island Relationship to Gene | Enhancer Region | DNase Hyper-sensitivity Site |
|---|---|---|---|---|---|
| 1 | chr3:15286143-15286274 | SH3BP5 | 5'UTR:Body | TRUE | TRUE |
| 2 | chr17:77848690-77848800 | (JD529337)[e] | | TRUE | TRUE |
| 3 | chr12:118725604-118725889 | CIT | Body | TRUE | |
| 4 | chr1:154198084-154198623 | ARHGEF2 | Body | TRUE | TRUE |
| 5 | chr12:28015205-28015607 | PTHLH | 5'UTR (TSS1500) | | |
| 6 | chr11:2511670-2512178 | KCNQ1 | Body | TRUE | |
| 7 | chr1:8194584-8194818 | (JD505160) | | TRUE | TRUE |
| 8 | chr12:110319267-110319654 | (see footnote)[f] | | | |
| 9 | chr5:161207831-161208167 | GABRA1 | 5'UTR (TSS1500:TSS200) | | |
| 10 | chr19:5538686-5538939 | SAFB2 | Body | | |
| 11 | chr6:25135475-25135786 | BC070382[g] | | | |
| 12 | chr10:134072408-134072501 | PWWP2B | Body:3'UTR | | |
| 13 | chr1:10818517-10818704 | | | TRUE | TRUE |
| 14 | chr1:1385949-1386143 | ATAD3C | Body | | |
| 15 | chr10:53743705-53744974 | DKK1 | 5'UTR:Body | | TRUE |
| 16 | chr11:20588323-20588561 | SLC6A5 | Body | TRUE | |
| 17 | chr10:134210902-134211265 | INPP5A | Body | | |
| 18 | chr5:10702368-10703458 | ANKRD33B | Body | | |
| 19 | chr16:85998896-85999172 | ZCCHC14 | 3'UTR | | TRUE |
| 20 | chr13:105827274-105827476 | (LINC00460) | | | |
| 21 | chr5:1010475-1010610 | | | TRUE | TRUE |
| 22 | chr2:216945117-216945376 | MARCH4 | 5'UTR (TSS1500:TSS200) | | |

FIG. 3A-1

| M | Associated Gene Function[c] | Differential Methylation in Oral/Pharyngeal Tumor Tissue[a] | |
|---|---|---|---|
| | | FDR-adjusted Q-value | Median Difference[d] (range) |
| 1 | Inhibits phosphorylation activity of Bruton Agammaglobulinemia Tyrosine Kinase; may play a role in BCR-induced apoptosis | 1.12E-07 | -0.19 (-0.35, -0.04) |
| 2 | | 9.86E-09 | -0.14 (-0.17, -0.07) |
| 3 | Serine/threonine-protein kinase that plays a role in cell division/cytokinesis | 3.04E-09 | 0.32 (0.13, 0.46) |
| 4 | Plays a fundamental role in cellular processes initiated by extracellular stimuli via G protein coupled receptors | 4.21E-09 | -0.22 (-0.31, -0.01) |
| 5 | Neuroendocrine peptide member of the parathyroid hormone family that is a critical regulator of cellular and organ growth, development, migration, differentiation and survival and of epithelial calcium ion transport | 3.97E-06 | -0.19 (-0.29, 0.37) |
| 6 | Voltage-gated potassium channel required for the repolarization phase of the cardiac action potential; exhibits tissue-specific imprinting | 3.04E-09 | -0.29 (-0.52, -0.10) |
| 7 | | 1.40E-06 | -0.13 (-0.26, 0.09) |
| 8 | | 1.12E-07 | -0.04 (-0.06, 0.01) |
| 9 | Receptor for gamma-aminobutyric acid (GABA), which is the major inhibitory neurotransmitter in the brain | 5.08E-06 | 0.09 (-0.03, 0.66) |
| 10 | Binds to scaffold/matrix attachment region (S/MAR) DNA; may function as an estrogen receptor corepressor or inhibitor of cell proliferation | 0.00015 | 0.25 (-0.35, 0.27) |
| 11 | | 3.04E-09 | -0.29 (-0.47, -0.04) |
| 12 | PWWP Domain-Containing Protein 2B | 6.28E-08 | 0.21 (-0.10, 0.29) |
| 13 | | 0.00066 | -0.16 (-0.28, 0.19) |
| 14 | ATPase Family AAA Domain-Containing Protein 3C | 9.23E-08 | -0.17 (-0.36, 0.03) |
| 15 | Member of the dickkopf protein-coding gene family, which play an important role in vertebrate development | 0.59 | -0.02 (-0.10, 0.57) |
| 16 | Solute-carrier transporter involved in the clearance of extracellular glycine during glycine-mediated neurotransmission | 3.51E-06 | -0.03 (-0.06, 0.001) |
| 17 | Membrane-associated type I inositol 1,4,5-trisphosphate (InsP3) 5-phosphatase that mobilizes intracellular calcium and acts as a second messenger for mediating cell responses to various stimulation | 1.89E-07 | -0.09 (-0.42, -0.0004) |
| 18 | Ankyrin Repeat Domain-Containing Protein 33B | 7.67E-09 | 0.14 (0.03, 0.18) |
| 19 | Zinc Finger CCHC Domain-Containing Protein 14; interacts with nuclear transcription factors NFIC and NFIX | 0.13 | 0.09 (-0.42, 0.20) |
| 20 | (long non-coding RNA of unknown function) | 3.34E-08 | -0.26 (-0.48, 0.04) |
| 21 | | 8.09E-05 | -0.19 (-0.34, 0.11) |
| 22 | E3 ubiquitin-protein ligase that may mediate ubiquitination of MHC-I and CD4, and promote their subsequent endocytosis and sorting to lysosomes via multivesicular bodies | 0.00076 | -0.04 (-0.06, 0.08) |

Characteristics of *Testing* set cases for each of the two case-associated methylation classes (rRL and rRRR) relative to those in the other five classes.

| Characteristic | Methylation Class | | | |
| --- | --- | --- | --- | --- |
| | rRL (n = 20) | rRRR (n = 13) | All Other Classes (n = 18) | p_difference |
| Age, median (range) | 56.5 (29-78) | 54.0 (33-78) | 62.5 (31-76) | 0.43[c] |
| Sex | | | | 0.33[d] |
|   Female | 8 (40.0%) | 2 (15.4%) | 6 (33.3%) | |
|   Male | 12 (60.0%) | 11 (84.6%) | 12 (66.7%) | |
| Race | | | | 0.29[d] |
|   White | 18 (90.0%) | 11 (84.6%) | 18 (100%) | |
|   Other | 2 (10.0%) | 2 (15.4%) | 0 | |
| Cigarette smoking[a] | | | | 0.63[d] |
|   Never | 7 (38.9%) | 4 (30.8%) | 4 (23.5%) | |
|   Ever | 11 (61.1%) | 9 (69.2%) | 13 (76.5%) | |
|     Pack-years, median (range) | 16.5 (1.2-48) | 25.0 (5.5-60) | 22.0 (0.9-94) | 0.56[c] |
| Alcohol use[a] | | | | 0.21[d] |
|   Non-drinker | 1 (5.6%) | 2 (15.4%) | 0 | |
|   ≤ 2 drinks/day | 10 (55.6%) | 8 (61.5%) | 7 (41.2%) | |
|   > 2 drinks/day | 7 (38.9%) | 3 (23.1%) | 10 (58.8%) | |
| HPV Serology[b] (E6 or E7 antibodies) | | | | 0.11[d] |
|   Negative | 12 (66.7%) | 4 (36.4%) | 13 (76.5%) | |
|   Positive | 6 (33.3%) | 7 (63.6%) | 4 (23.5%) | |
| Primary Tumor Site | | | | 0.53[d] |
|   Oral cavity | 13 (65.0%) | 6 (46.2%) | 10 (55.6%) | |
|   Oropharynx | 4 (20.0%) | 6 (46.2%) | 7 (38.9%) | |
|   Hypopharynx | 3 (15.0%) | 1 (7.7%) | 1 (5.6%) | |
| AJCC Stage Group | | | | 0.25[d] |
|   Local (stage I or II) | 6 (30.0%) | 4 (30.8%) | 10 (55.6%) | |
|   Advanced (stage III or IV) | 14 (70.0%) | 9 (69.2%) | 8 (44.4%) | |
| Tumor Size (T class) | | | | 0.29[d] |
|   T1-T2 | 14 (70.0%) | 9 (69.2%) | 16 (88.9%) | |
|   T3-T4 | 6 (30.0%) | 4 (30.8%) | 2 (11.1%) | |

Footnotes:
[a] Smoking and alcohol data was missing for 2 cases in class rRL and 1 case in "All Other Classes"
[b] HPV16 E6/E7 serology data was missing for 2 cases in class rRRR and 1 case in "All Other Classes"
[c] Kruskall-Wallis test
[d] Fisher's exact test

FIG. 6

CpG ISLAND METHYLATION PROFILE IN NON-INVASIVE ORAL RINSE SAMPLES FOR DETECTION OF ORAL AND PHARYNGEAL CARCINOMA

RELATED APPLICATIONS

This application is the U.S. Non-Provisional Application claiming priority to U.S. Provisional Patent Application No. 62/418,339 filed Nov. 7, 2017, the entirety of which is incorporated herein by reference.

RELATED APPLICATIONS

This invention was made with Government support under K22CA172358 NIH/NCI and R01CA100679 NIH/NCI awarded by the National Institutes of Health. The Government has certain rights in this invention.

FIELD

The present application relates generally to methods of improving the diagnoses of cancer in a subject, and in particular, to method of improving the diagnosis of oral and pharyngeal cancer in a subject.

BACKGROUND

Oral and pharyngeal cancer are major public health concerns in the United States, where there were an estimated 42,440 new cases of oral and pharyngeal cancer diagnoses (it is the 8th most common form of cancer in men) and 8,390 deaths in 2014. This problem is even more pronounced on the global scale, with 442,760 incident cases and 241,458 deaths worldwide in 2012; rates are particularly high in parts of Western Europe, Southeast Asia, and Oceania. The relatively high mortality is, in part, due to the fact that the majority of patients initially present at an advanced stage, which is associated with a much poorer prognosis. Additionally, oral and pharyngeal cancer carries a very high morbidity, with associated disfigurement and impairment of basic functions, such as talking, swallowing, eating and breathing, that is exacerbated by more advanced disease and the associated disease treatments. Taken together, these considerations underscore the importance of early detection in reducing the adverse impact of this disease.

DNA methylation is a common epigenetic event associated with the genesis of oral and pharyngeal carcinoma, often preceding the onset of frank malignancy. DNA methylation may occur primarily in the context of CpG dinucleotides, which are disproportionately concentrated in enriched regions referred to as CpG islands. CpG islands are commonly situated in the 5' promoter region of genes where their methylation is generally associated with transcriptional repression. However, methylation of CpG islands situated in inter- and intraenhancer regions can also impact the timing or spatial patterns of gene expression; there is mounting evidence that methylation of CpG islands located in the gene body can lead to increased transcriptional activation Furthermore, regional methylation can impact the expression of non-coding RNA, the sequences of which are commonly situated in intronic or intergenic regions. Methylation of CpG islands can arise aberrantly during disease development and progression, but can also occur as part of normal biological processes, such as X-inactivation, imprinting or tissue differentiation.

Currently, no proven screening techniques are in widespread use for oral and pharyngeal cancer aside from visual inspection and palpation, which are provided by dentists and clinicians on an opportunistic basis and lack sensitivity (particularly for pharyngeal tumors) and varies according to the skill of the clinician performing the exam. Oral rinse can be utilized as a non-invasive ascertainment technique for detection of DNA methylation in these cancers, and therefore has potential in biomarker-based screening applications, particularly among high-risk groups or for post-treatment surveillance. While previous efforts have primarily focused on a limited set of candidate promoter regions, epigenome-wide strategies may offer a more comprehensive approach for discovery.

SUMMARY

Systematic evaluation of methylation over predefined aggregate regions, such as CpG islands, can help to mitigate issues relating to false-discovery rate and technical noise that can complicate epigenome-wide assessment of large numbers of individual loci. An objective of an embodiment of the invention is to address these needs through epigenome-wide interrogation via the Infinium HumanMethylation450 BeadArray for identification and validation of a novel sentinel CpG island methylation profile in non-invasive oral rinse samples that may be useful in predicting oral and pharyngeal carcinoma.

Accordingly, embodiments of the invention are directed to a method of diagnosing a subject with head and/or neck squamous cell carcinoma that includes obtaining a saliva sample from the subject, determining the presence or absence of a methylation classifier based on CpG islands, and diagnosing the subject as having head or neck squamous cell carcinoma if the methylation classifier is present or not having head or neck squamous cell carcinoma if the methylation classifier is not present.

Another embodiment is directed to a method of monitoring the response to treatment of a subject having head and/or head and/or neck squamous cell carcinoma that includes obtaining a first saliva sample from the subject prior to treatment of the subject with a therapeutic agent or a combination of therapeutic agents, determining the presence or absence of a methylation classifier based on CpG islands in the first saliva sample. Then, administering to the subject the therapeutic agent or the combination of therapeutic agents before obtaining a second saliva sample from the subject and determining the presence or absence of the methylation classifier based on CpG islands in the second saliva sample.

Another embodiment is directed to an improved method of diagnosing a subject with head and/or neck squamous cell carcinoma, the improvement the including obtaining a saliva sample from the subject, determining the presence or absence of a methylation classifier based on CpG islands, and diagnosing the subject as having head or neck squamous cell carcinoma if the methylation classifier is present or not having head or neck squamous cell carcinoma if the methylation classifier is not present.

In embodiments of the invention, determining the methylation status of the CpG islands in the methylation classifier may include the steps of extracting DNA from the saliva sample, bisulfite modifying said extracted DNA sample, amplifying the extracted DNA sample, fragmenting said amplified DNA sample, hybridizing the fragmented DNA sample with a plurality of probes, wherein each of the plurality of probes is bound to a substrate, and further wherein each of the plurality of probes corresponds with a CpG island in the methylation classifier. The methylation status determination process further includes extending the probe with a single labeled base and processing the probe to identify the methylation status of the CpG islands in the sample from the methylation classifier.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

FIG. 3A illustrates the footnotes to Table 2.

FIG. 6 illustrates Table 3.

DETAILED DESCRIPTION

Figure 3:
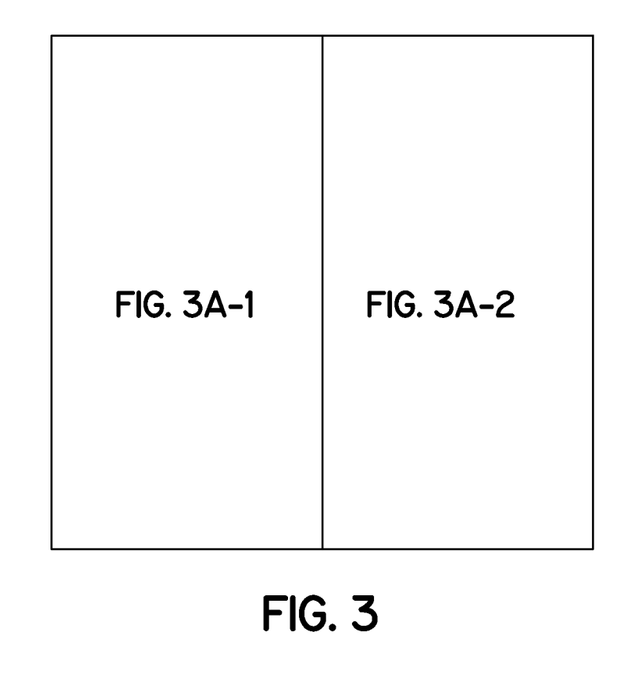
FIG. 3 includes FIGS. 3A-1 and 3A-2, which illustrate Table 2.
Figure 3A:
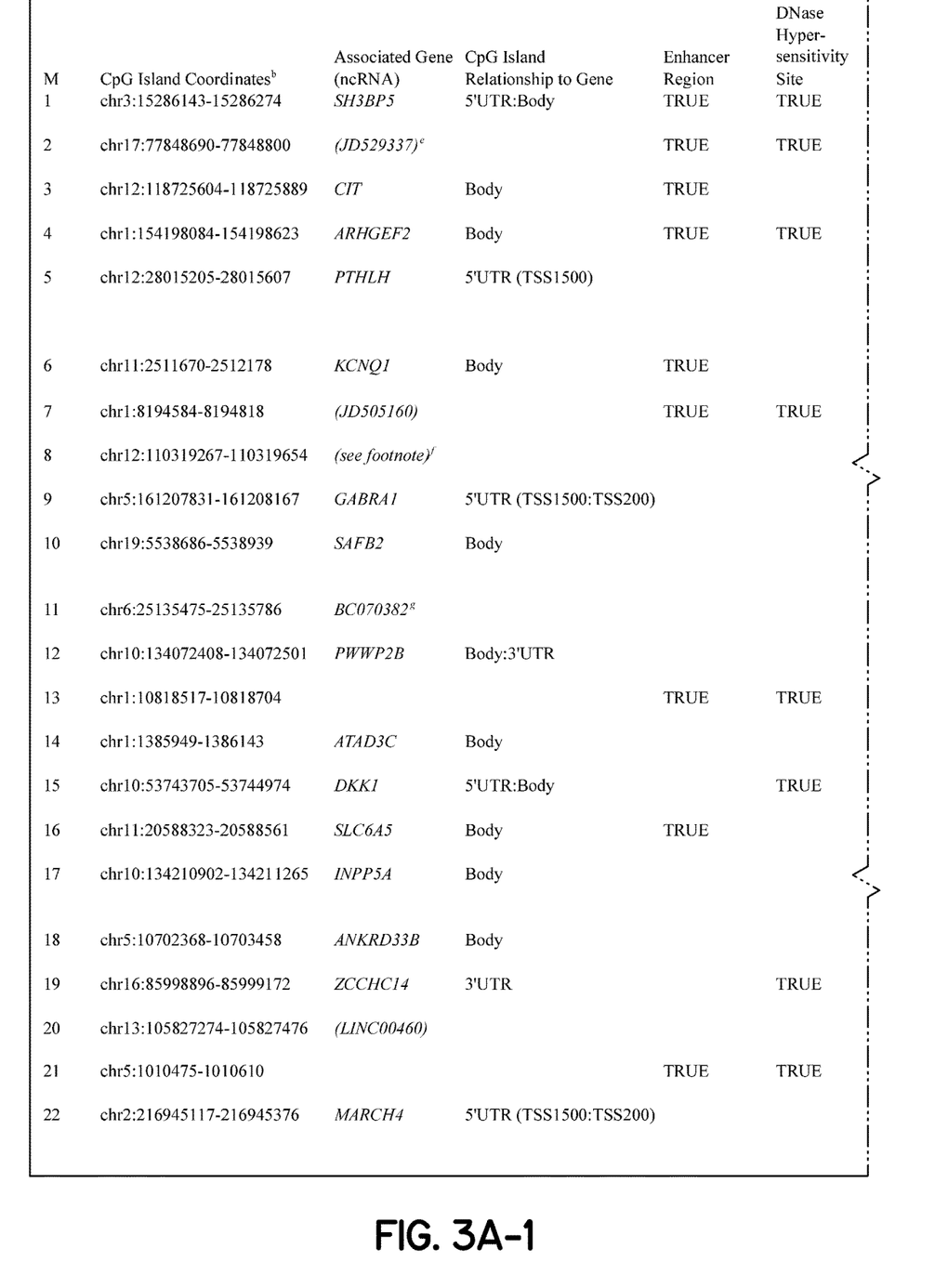

An aspect of the invention is directed to minimally invasive methods of diagnosing a subject with a head and/or neck squamous cell carcinoma. The method includes obtaining a saliva sample from the subject, such as with an oral rinse, and determining the presence or absence of a methylation classifier based on CpG islands. In embodiments of the invention, the presence of the methylation classifier in the subject's saliva sample is used to diagnose the subject as having head and/or neck squamous cell carcinoma. In embodiments of the invention, the methylation classifier may be based on CpG islands, which may be broken into methylation classes. In an embodiment, the methylation classifier is based on the methylation status of between 15 and 30 CpG islands. In another embodiment, the methylation classifier is based on the methylation status of between 15 and 25 CpG islands. In another embodiment, the methylation classifier is based on the methylation status of between 20 and 25 CpG islands. In another embodiment, the methylation classifier is based on the methylation status of no more than 22 CpG islands. In another embodiment, the methylation classifier is based on the methylation status of the 22 islands identified in Table 2, illustrated in FIGS. 3A-1, 3A-2, and 3A. In certain embodiments, the methylation classes may include rRL and rRRR classes. The methylation classifier may also be used to monitor the response to treatment of a subject having head and/or neck squamous cell carcinoma.

Another aspect of the invention is directed to kits for practicing the invention. The kits include one or more components as described herein for identifying the presence of one or more methylation classifiers. The components may include one or more gene sequences.

To be clear, the present application describes the technological process of diagnosing certain types of cancer. In accordance with this invention, this technological process is improved in any number of ways. For instance, an improvement is the non-invasive nature of the present invention. Cancer previously was found from routine digital manipulation of the throat and neck area. Suspicious lumps were then biopsied (invasive). This invention allows the doctor to diagnose cancer by simply analyzing a saliva sample (non-invasive). Another improvement is in the increased speed, accuracy, and reliability of obtaining a cancer diagnosis in accordance with this invention. Yet another improvement in accordance with this invention is detecting cancer at an earlier stage than is currently possible. By routinely taking a saliva sample, the cancerous lump need not grow so large that a doctor can feel it, as is the current test. Early detection of cancer significantly improves the likelihood of successfully treating the cancer.

Embodiments of the method include obtaining a saliva sample from the subject that includes cells from the oral cavity, the pharynx (including the oropharynx and the hypopharynx), or both the oral cavity and the pharynx. In embodiments of the invention, the saliva sample is collected with an oral rinse or by swabbing the mouth, throat, or both the mouth and throat. In embodiments utilizing an oral rinse, the subject is asked to swish his or her mouth with a volume of a sample collection solution for a predetermined duration. In an embodiment, the volume is in a range from 15 ml to 45 ml and in an embodiment, the volume is 30 ml, plus or minus 5 ml). An exemplary sample collection solution is an alcohol-free mouth wash. In an embodiment, the predetermined duration is from 15 second to 90 seconds, or from 15 seconds to 60 seconds, or from 15 second to 45 seconds, or 30 seconds. Embodiments of the kit may include the sample collection solution, swab, or both a sample collection solution and a swab. Embodiments of the kit may also include a vessel in which to collect the sample collection solution or swab.

In an embodiment, after collecting the saliva sample, such as by oral rinse, the cells in the saliva sample are collected, such as by centrifugation to form a pellet. The sample collection solution may then be discarded from the pellet of collected cells. The collected cells may be processed immediately, as described below, or stored until processing. If the saliva sample is collected on a swab, the swab may be processed immediately or stored until processing. In embodiments of the invention, the samples are stored in a freezer at −80 degrees Celsius before processing, such as in a freezer.

After collection, DNA is extracted from the collected cells using routine techniques. In an embodiment, the DNA is genomic DNA.

The methylation status of the CpG islands in the methylation classifier of the extracted DNA is then determined. In embodiments of the invention, the methylation status of CpG islands is determined using the bisulfite method to modify non-methylated cytosine residue to uracil. Accordingly, in some embodiments, the extracted DNA is treated with bisulfite under conditions whereby cytosine residues that are not methylated are deaminated to uracil residues and whereas methylated cytosine residues are protected.

The following paragraphs describe an exemplary method employing a bisulfite modification procedure to determine the methylation status of the CpG islands in the methylation classifier.

After bisulfite modification, the modified DNA is amplified. In an embodiment, the modified DNA is amplified via an isothermal amplification step. In these embodiments, isothermal amplification has the benefit of amplifying the genomic modified DNA without CG bias, which can occur with PCR amplification. In embodiments of the invention, isothermal amplification is conducted at around 37 degrees Celsius over a period of time between 20 hours and 24 hours.

After amplification, the amplified DNA sample is fragmented. In embodiments of the invention, the DNA sample is enzymatically fragmented. In and embodiment, the DNA sample is end point fragmented, which as the benefit of preventing over fragmentation of the DNA sample.

After fragmentation, the fragmented DNA sample may be precipitated, such as with 100% isopropyl alcohol and collected, such as by centrifugation. After centrifugation, the supernatant is removed and the pellet allowed to dry, such as at room temperature under ambient conditions. The precipitated DNA sample may then be resuspended in a suspension buffer.

The resuspended fragmented DNA sample may then be hybridized with a probe comprising complimentary nucleic acid sequence that is sequestered to a substrate to form a hybridization product. In an embodiment, the substrate is a bead and the bead is bound to a surface. In an embodiment, the probe includes a nucleic acid sequence that corresponds with the nucleic acid sequence for at least one of the CpG island of the methylation classifier. The free end of the nucleic acid sequence of the probe ends at the nucleic acid immediately preceding the nucleic acid that would have been a cytosine in a CpG island. In an embodiment, the surface includes a plurality of beads with probes directed to a plurality of CpG islands of the methylation classifier. In an embodiment, the surface includes a plurality of beads with probes directed to sequences that correspond to CpG islands that are not in the methylation classifier. In an embodiment, each substrate includes complimentary. In an embodiment, the probes and beads for embedded in the surface to form an array. An exemplary array is an Illumina array included in the Infinium® HD Assay Methylation kit (available from Illumina).

After formation of the hybridization product, the probe may be enzymatically extended with a single base complementary to the bound fragmented DNA sample. The single base may be tagged with a label. The single base may be a labeled. In an embodiment, the label used with the bases thymidine (T) and adenine (A) is different from the label used with the bases cytosine (C) and guanosine (G). In an embodiment, the single bases are dideoxynucleotides, which limit the extension of the probe to a single base. In an embodiment, the labels include biotin and dinitrophenyl. In embodiment, the G and C bases are biotin labeled and the A and T bases are dinitrophenyl labeled. Homozygotes will have identical labels and whereas heterozygotes will have two different labels.

After the extension and labeling step, the probes are stained. This step applies a specific fluorescent signal to each labeled probe. For example, streptavidin, fluorescently labeled with a first color, is bound to biotin and anti-DNP antibody, fluorescently labeled with a second color, is bound to dinitrophenyl.

After staining, the probes may be scanned with a laser to determine the methylation status of the probe. Probes fluorescing to indicate the presence of a C or G bases came from a methylated CpG island, whereas probes fluorescing to indicate the presence of A or T bases came for an unmethylated CpG island in the saliva sample. Probe fluorescing to indicate the presence of a mixture of A or T and C or G bases came from a sample having a mixture of methylated states in the saliva sample.

Another aspect of the invention is directed to kits for practicing the invention. The kits include one or more components as described herein for identifying the presence of one or more methylation classifiers in a sample from a subject, such as a saliva sample. The components may include one or more gene sequences.

The following non-limiting Example demonstrates an embodiment of the invention.

EXAMPLE

Methods
Study Population

The study population included 154 cases with incident initial primary squamous cell carcinoma arising in the oral cavity (ICD-9: 141.1-141.5, 141.8, 141.9, 143-145.2, 145.5-145.9, 149.8, 149.9), oropharynx (ICD-9: 141.0, 141.6, 145.3, 145.4, 146, 149.0, 149.1), or hypopharynx (ICD-9: 148) diagnosed between October 2006 and June 2011 at major teaching hospitals located in Boston, Massachusetts (Brigham and Women's Hospital, Beth Israel Deaconess Medical Center, Boston Medical Center, Dana-Farber Cancer Institute, Massachusetts Eye and Ear Infirmary, Massachusetts General Hospital, and New England Medical Center) as part of a population-based study of head and neck cancer in the greater-Boston area (Collaborative Study of Head and Neck Diseases: CoHANDS) that has been previously described. For inclusion in the study, cases were required to reside in the greater Boston area or any of 162 contiguous cities and towns within approximately one-hour drive from Boston at the time of diagnosis. Cases with a prior history of malignancy other than nonmelanoma skin cancer were excluded from the analyses. Cancer-free control subjects (n=72) were randomly selected from 567 controls that were recruited into CoHANDS using a population-based design during the same time frame as the cases. All patients included in the analyses provided written informed consent prior to enrollment in the study, as approved by the Institutional Review Boards of the participating institutions.

Sample Collection, DNA Extraction, and Bisulfite Modification

Upon enrollment into CoHANDS (and prior to initiation of treatment for cases), subjects were asked to vigorously swish their mouths with approximately 30 ml of commercial alcohol-free mouthwash (ACT®) for 30 seconds. Samples were then centrifuged into cell pellets and stored at −80° C. in cryovials until DNA extraction. DNA was extracted using the QIAAMP® Blood Kit (Qiagen, Valencia, CA), using the spin protocol for DNA purification from blood or body fluids. Extracted DNA was bisulfite modified using the EZ-96® DNA Methylation-Direct Kit (Zymo Research, Irvine, CA) according to the Illumina's recommendations for the Infinium HumanMethylation450 BeadArray.

Infinium HumanMethylation450 BeadArray

The INFINIUM® HumanMethylation450 BeadArray assay was performed in three batches at the University of California San Francisco (UCSF) Institute for Human Genomics Core Facility (first and second batches) and University of Cincinnati (UC) Genomics, Epigenomics and Sequencing Core (third batch). Approximately 500 ng of bisulfite modified genomic DNA was provided to the respective facility for initial processing of the BeadArrays, with samples randomized to BeadChip positions to mitigate any impact of potential batch or chip effects. Raw image files were preprocessed using the RNbeads pipeline in R. All array data points are represented by fluorescent signals from both methylated (Cy5) and unmethylated (Cy3) alleles, and average methylation level (β) is derived from the ~18 replicate methylation measurements, β=(max(Cy5, 0))/(|Cy3|+|Cy5|+100). Beta (β)=1 indicates complete methylation; β=0 represents no methylation. Outliers were assessed using quality control plots generated through the RNbeads pipeline designed to diagnose problems such as poor bisulfite conversion or signal intensity issues. Functional normalization was performed using minfi.funnorm following background correction with the normal-exponential using out-of-band probes (NOOB) method. Any probes with a detection p-value>0.01 or that contained a single-nucleotide polymorphism (SNP) in the probe sequence were filtered out of the dataset prior to analysis. To account for any residual batch or chip effects, methylation data were adjusted using the ComBat method via the SVA package in Bioconductor.

Statistical Analysis

Average methylation was calculated for each autosomal CpG island (determined by the Hidden Markov Model approach, which provides a more accurate approach for identification of CpG islands than expected CG content based filtering strategies36) that spanned at least 3 CpG loci on the HumanMethylation450 BeadArray (after filtering). Without intending to be bound by any particular theory, it was believed that assessment of CpG island methylation, as opposed to the individual locus approach, would provide more stable estimates that are less readily influenced by outliers due to technical variation.

A semi-supervised recursively partitioned mixture modeling (SS-RPMM) algorithm was applied to identify a novel set of CpG islands for which methylation in oral rinse samples were predictive of oral and pharyngeal carcinoma case-status. This method is based both on the semi-supervised procedure proposed by Bair and Tibshirani and recursively partitioned mixture models (RPMM) developed by Houseman et al. To avoid over-fitting the data and provide for validation of the model, subjects were randomly partitioned into either a Training set (for the initial analysis) or Testing set (for subsequent validation) at a 2:1 ratio (front-loaded to increase the precision of the classifier identified in the Training set), stratified by case-control status to ensure an equal distribution between sets. A series of linear mixed-effects models were then fit to logit-transformed average methylation (M) values to identify CpG islands most associated with case-status, and were adjusted for age, sex, smoking pack-years, and alcohol consumption (typical number of alcoholic beverages per week) with a random effect term for batch/processing site (UCSF or UC). CpG islands were ranked based on the absolute value of the t-statistic for case-status. The top M loci were selected using a nested cross-validation procedure to train a classifier for case/control status by fitting a RPMM to the training data to cluster subjects using the M selected loci. To predict class membership in the Testing set, the latent class structure from the RPMM fit to the training data was applied using an empirical Bayes procedure. Unconditional logistic regression was used to calculate the magnitude of the association between methylation class and oral and pharyngeal carcinoma, controlling for potential confounding covariates (age, sex, smoking pack-years, and alcohol consumption). Receiver operating characteristic (ROC) curves and corresponding area under the curve (AUC) were generated to assess the performance of the DNA methylation classifier.

Results

Figure 1:
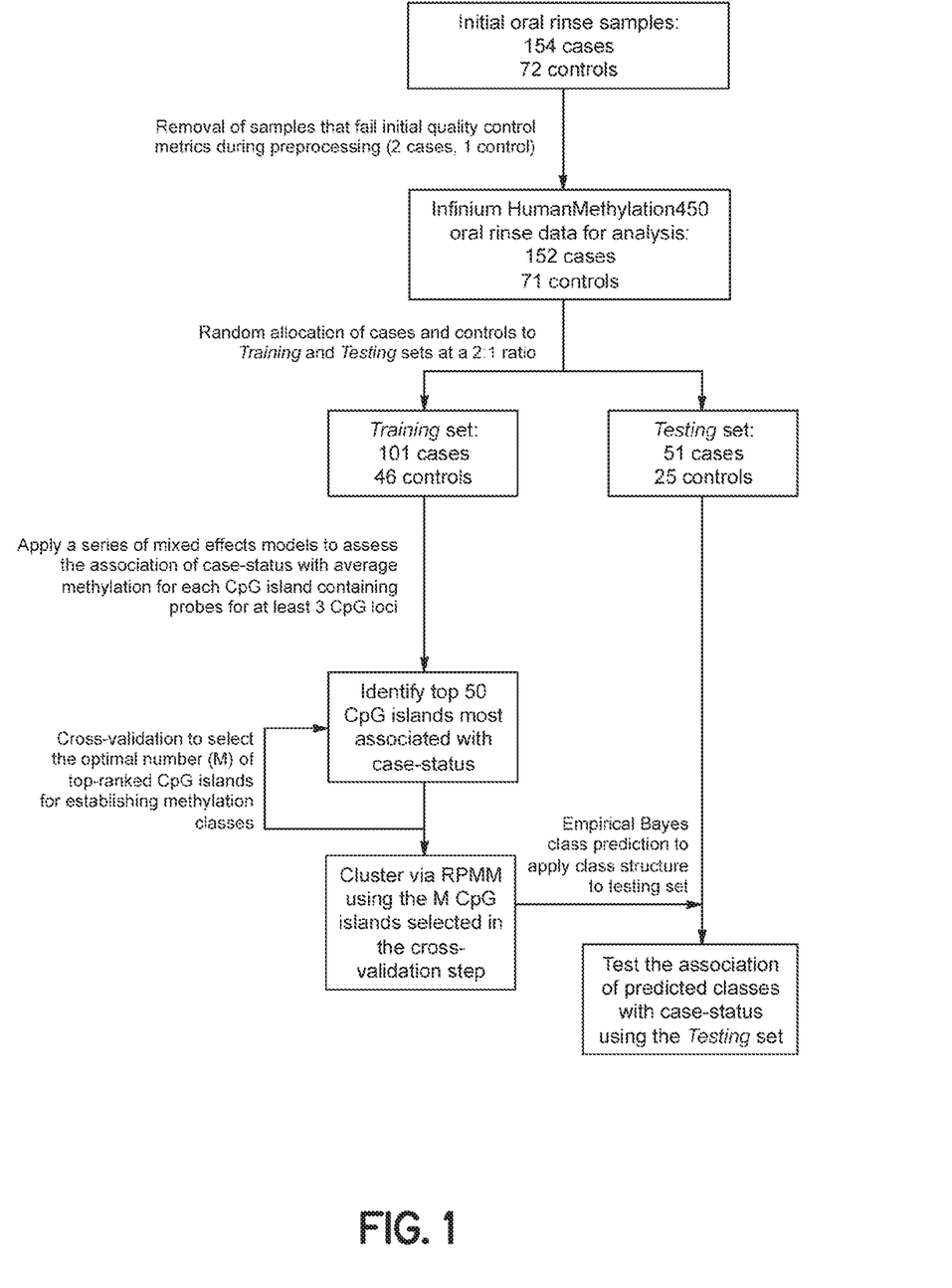
FIG. 1 is a flow chart of a method of identifying a methylation classifier.
Figure 2:
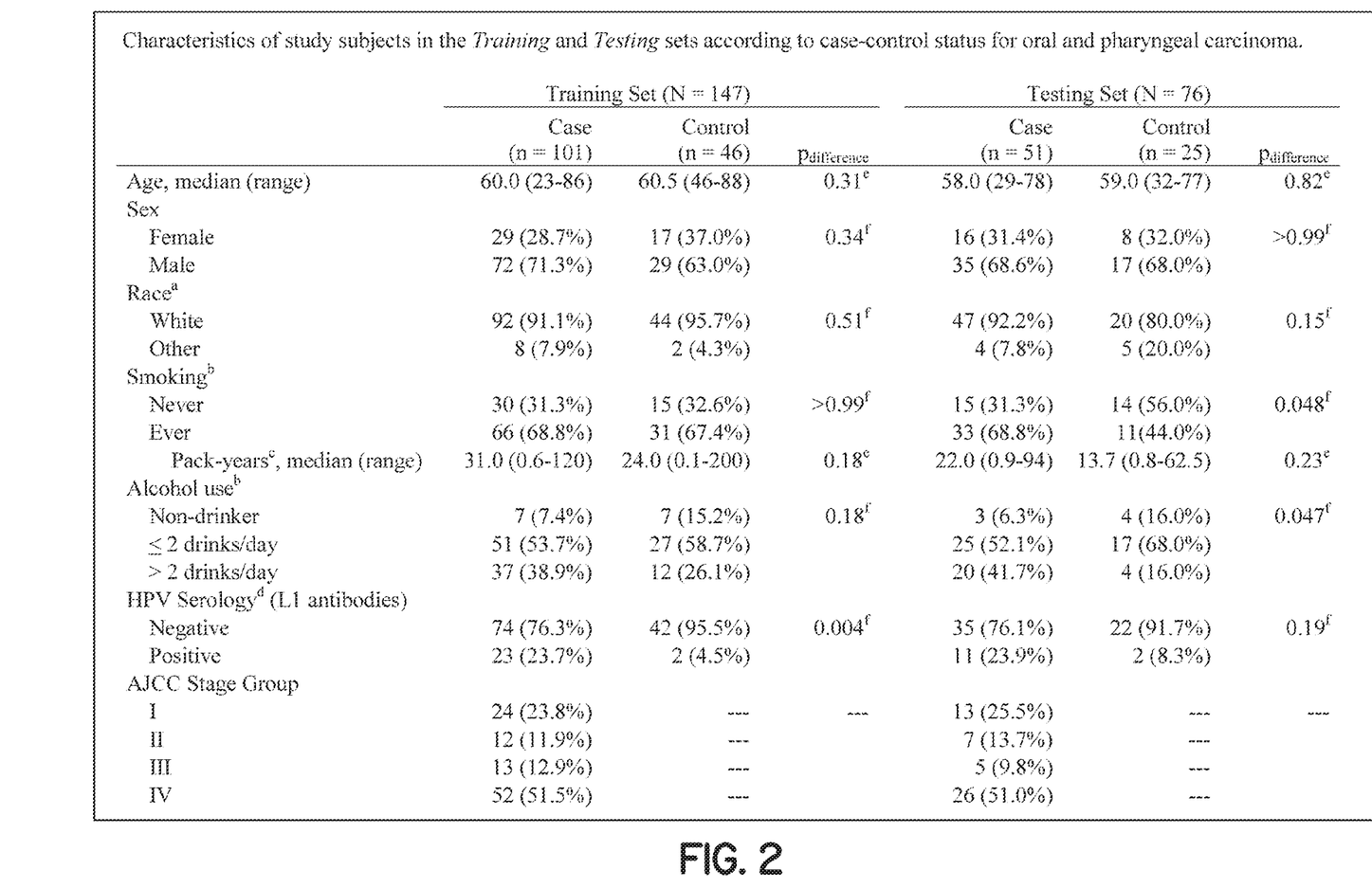
FIG. 2 illustrates Table 1.
Figure 2A:
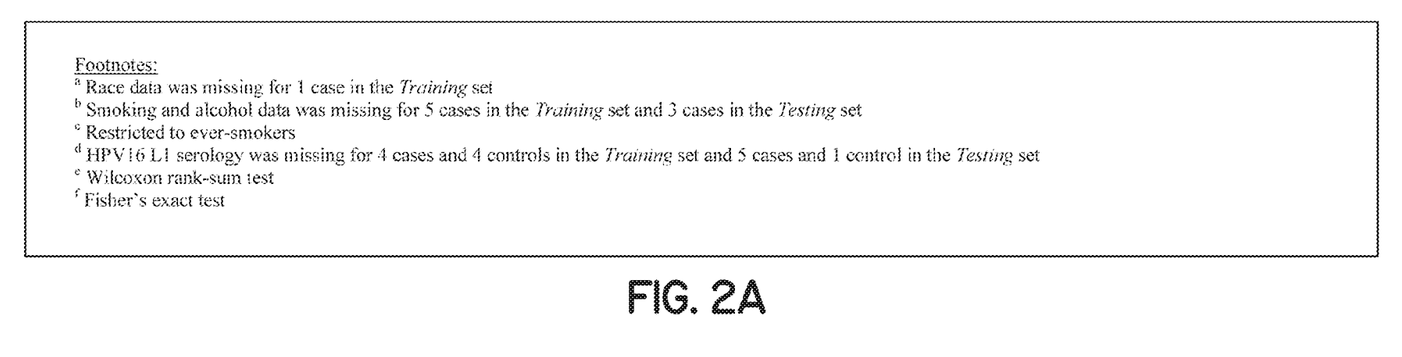
FIG. 2A illustrates the footnotes to Table 1.

A general schematic of our analytic workflow is presented in FIG. 1. Study participants were randomly partitioned into the Training and Testing sets at a 2:1 ratio, which resulted in 157 subjects in the Training set (101 cases, 46 controls) and 76 in the Testing set (51 cases, 25 controls); 3 of the original 226 samples (2 cases, 1 control) failed initial quality control measures and were excluded from the analyses. A description of the study population for the Training and Testing sets by case-control status is presented in Table 1, illustrated in FIGS. 2 and 2A.

There was a total of 32,465 CpG islands represented by at least 3 CpG probes on the HumanMethylation450 BeadArray. After fitting a series of individual linear mixed effects models for average methylation each of these CpG islands and ranking them according to absolute t-statistic using only the Training set data, we determined that a methylation classifier based on 22 CpG islands formed the optimal number of top CpG loci for discriminating between cases and controls, resulting in 7 distinct methylation classes. A description of each of these 22 CpG islands, along with their bioinformatic attributes, is presented in Table 2, illustrated in FIGS. 3A-1, 3A-2, and 3A.

Figure 4A:
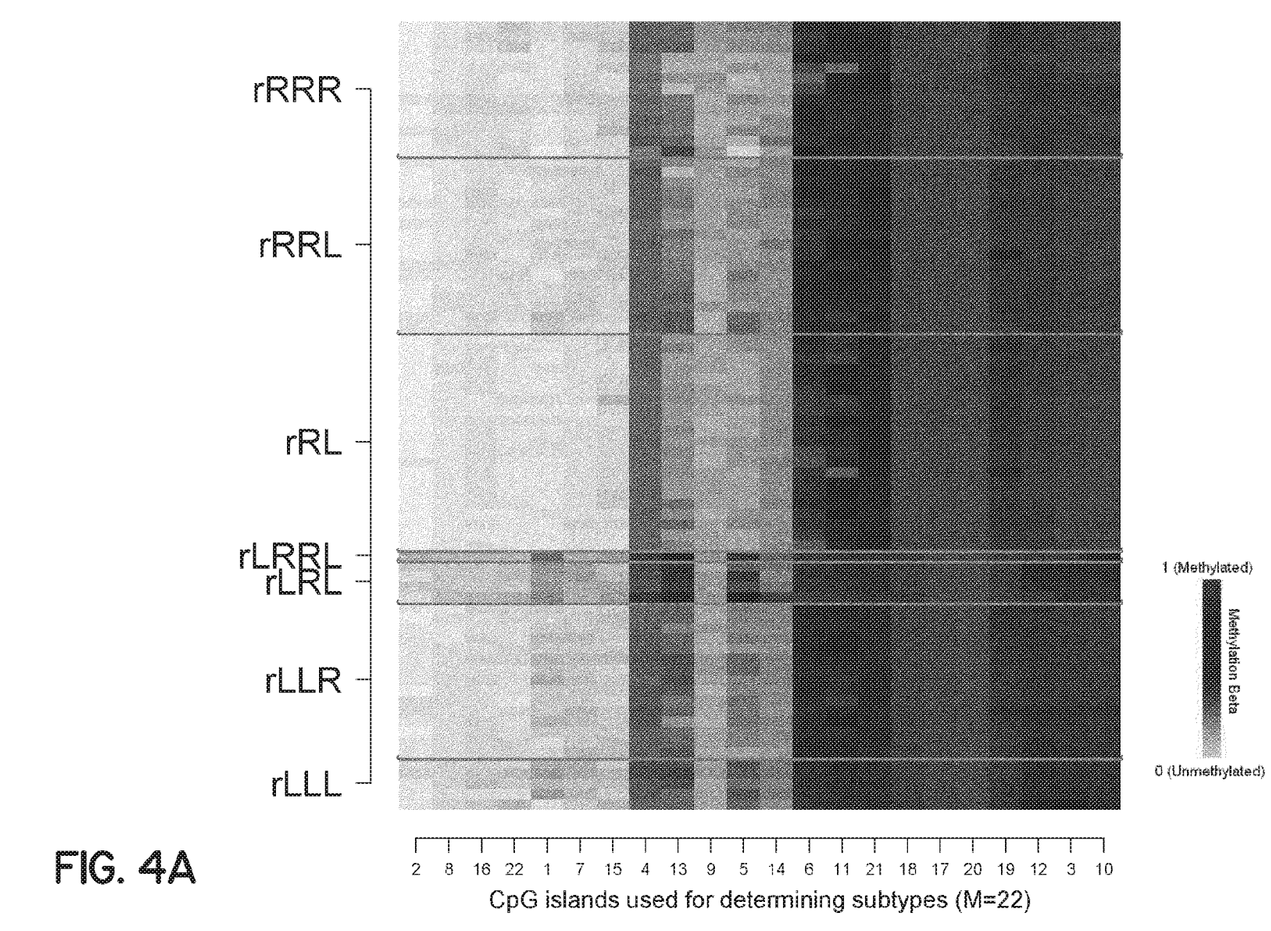
FIG. 4A illustrates a heat map of methylation profiles of a panel of CpG islands in a methylation classifier in accordance with embodiments of the invention.
Figure 4B:
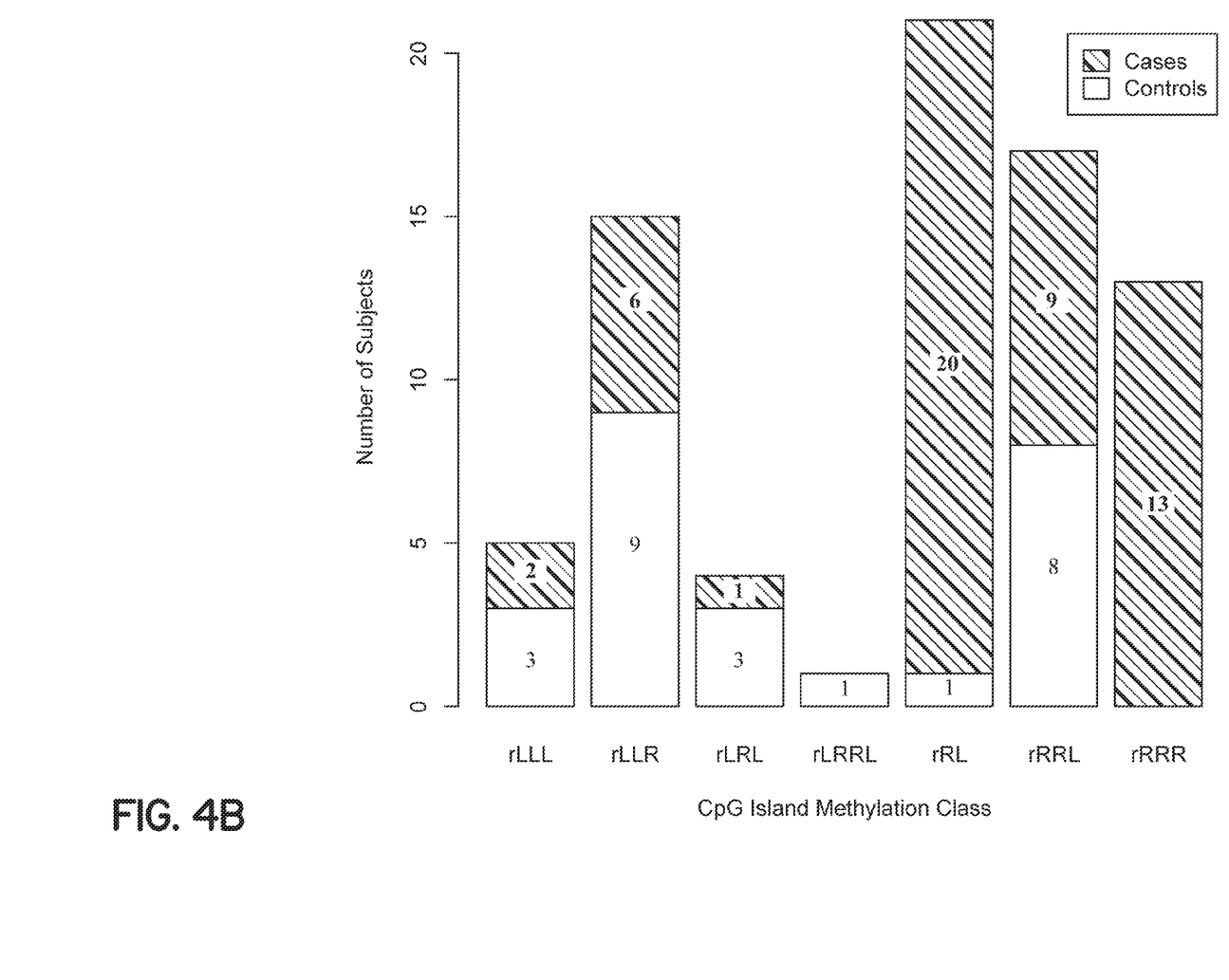
FIG. 4B is a bar graph illustrating clustering of methylation classes.

This class structure was validated and its predictive power was tested by applying the latent structure of the methylation classes established in the Training set to the Testing set. A heatmap of the methylation profiles of each of the 22 CpG islands for the subjects assigned to the Testing set by methylation class is presented in FIG. 4A. Two methylation classes, rRL and rRRR (denoted according to left and right branches on the dendogram from the clustering procedure), particularly standout as being "case-heavy" (FIG. 4B), which collectively include 33 cases and only 1 control. When considered together, the association of these two classes with case-status relative to all other classes is remarkably strong, with a crude OR=43.8 (95% CI: 8.1, 816.7) and adjusted OR=76.9 (95% CI: 11.8, 1818.2). The sensitivity and specificity of classes rRL and rRRR for correctly predicting case status is 64.7% and 96.0%, respectively.

Figure 5A:
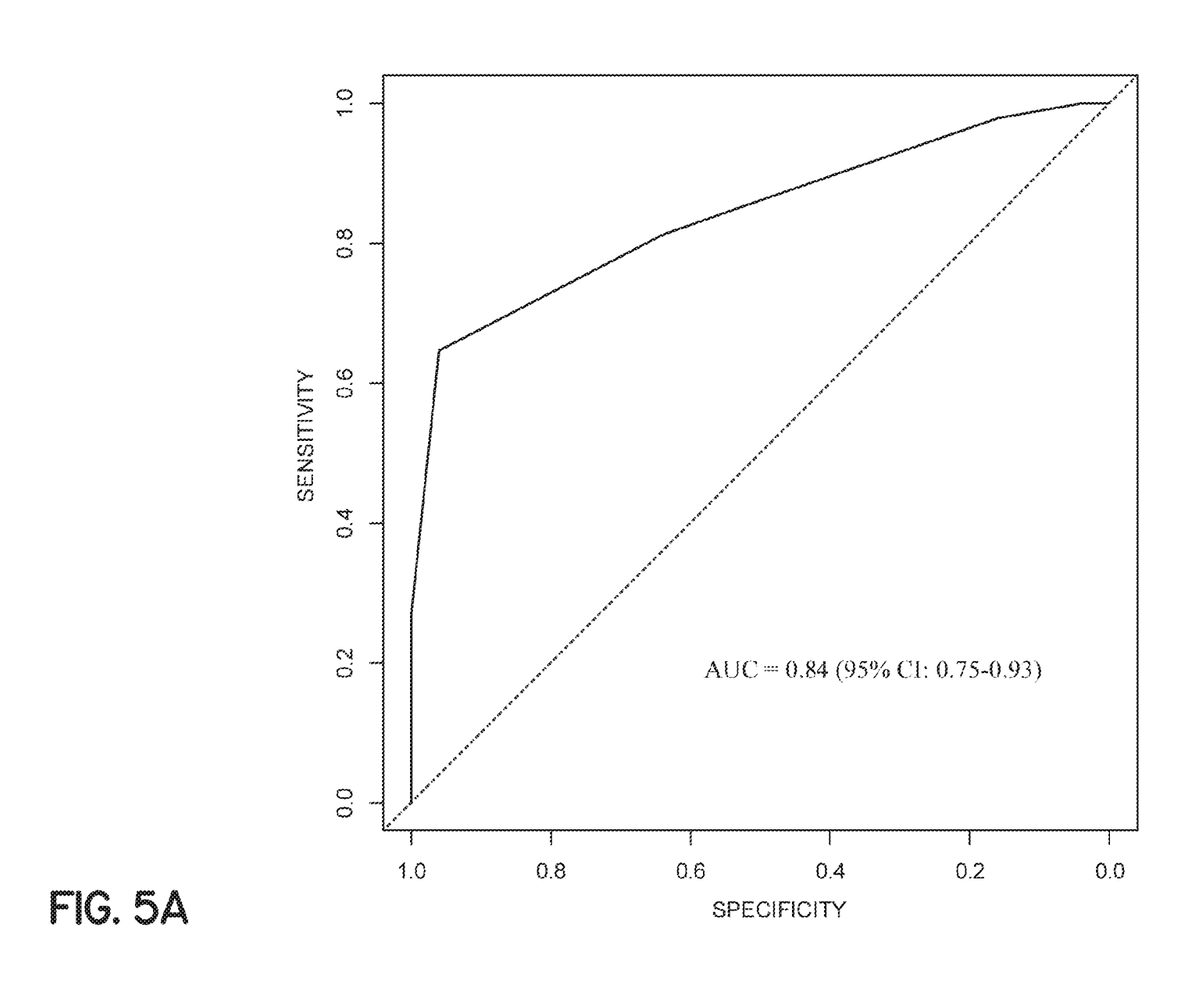
FIG. 5A is a ROC curve illustrating the association of case studies with methylation status of CpG islands.
Figure 5B:
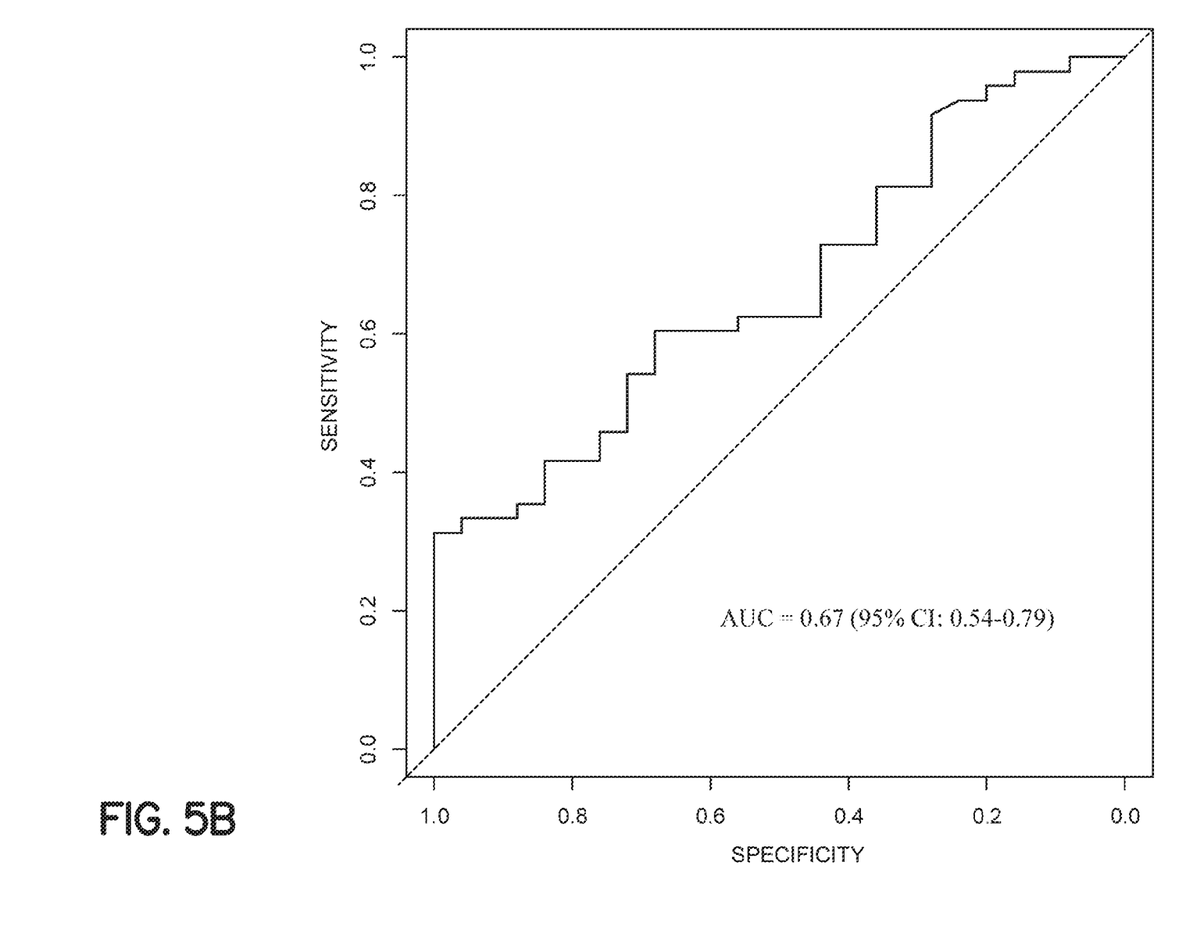
FIG. 5B is a ROC curve illustrating the association of case studies with methylation status of CpG islands.
Figure 5C:
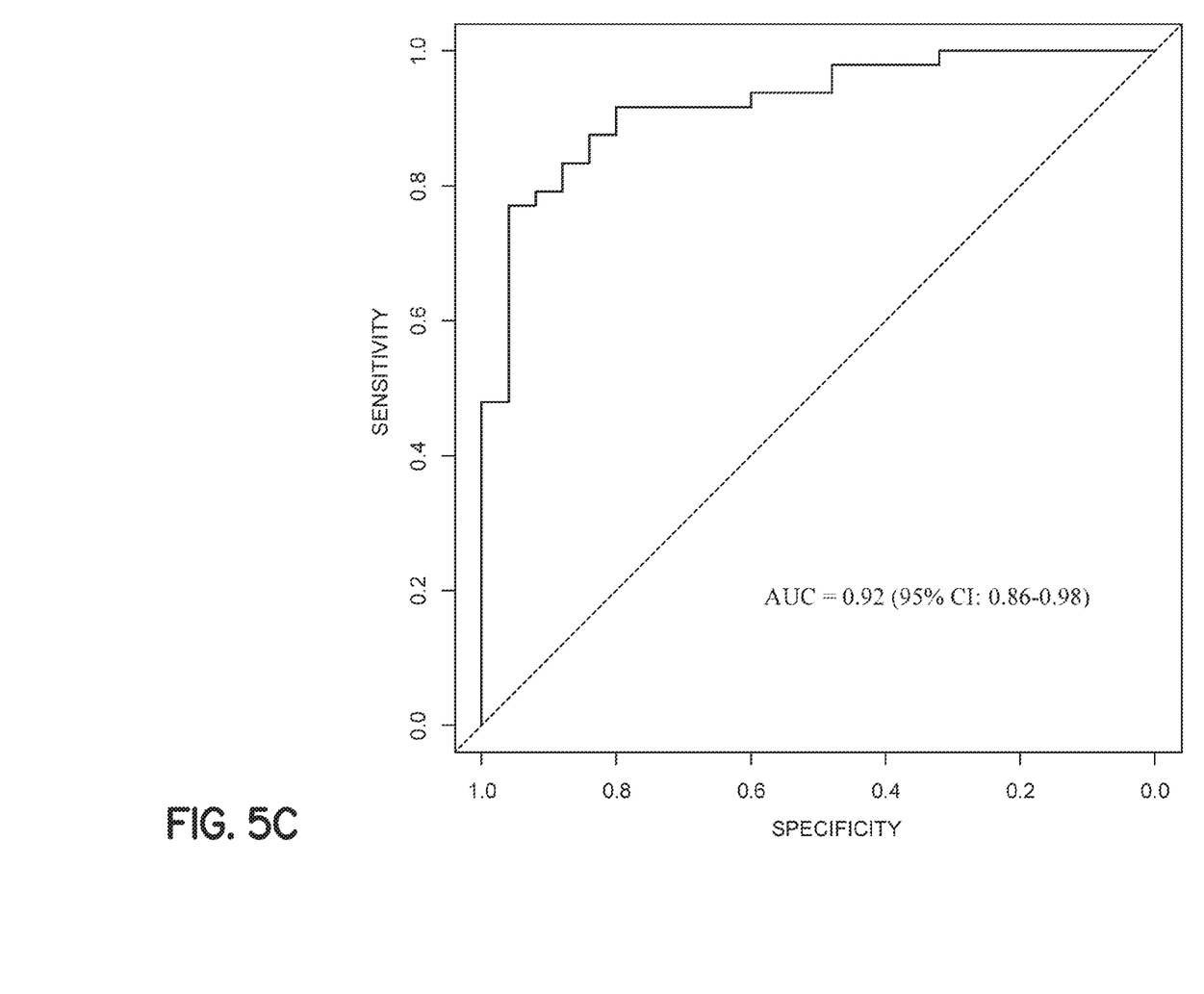
FIG. 5C is a ROC curve illustrating the association of case studies with methylation status of CpG islands.

To further assess the performance of the classifier in the Testing set, ROC curves were constructed for the logistic regression models and calculated the corresponding AUC (FIGS. 5A-5C). When considering the association between case-status and methylation class alone (i.e. no other independent covariates in the model), the AUC was 0.84 (95% CI: 0.75-0.93). After additional adjustment for age, sex, smoking pack-years, and alcohol consumption, the AUC increased to 0.92 (95% CI: 0.86, 0.98).

In an effort to explore possible drivers of these findings, we assessed the sociodemographic and clinical characteristics of oral and pharyngeal carcinoma cases for each "case" class (rRL, n=20; and rRRR, n=13) relative to cases in all other classes (n=18) was assessed. No significant differences were observed across classes. However, while non-significant, class rRRR had a higher fraction of cases with seropositivity for HPV16 e6/e7 antibodies (p=0.11). Additionally, the "case" classes contained a somewhat higher, albeit non-significant, proportion of advanced stage cases, although it is notable that both cases also contain a sizable fraction of localized cancers and that the majority of cases have relatively smaller (T1-T2) tumors.

To evaluate the biological significance of the 22 CpG islands that form the methylation classifier, Infinium HumanMethylation450 BeadArray data was downloaded from The Cancer Genome Atlas (TCGA; http://cancergenome.nih.gov/) for all oral and pharyngeal carcinoma cases with paired adjacent normal tissue (34 pairs). With respect to the CpG islands forming the classifier, 20 of 22 were found to be significantly differentially methylated in tumor tissue relative to the adjacent normal tissue, based on the Wilcoxon signed-rank test and adjusting for false discovery rate (FDR) using the methods of Benjamini and Hochberg. The results of this analysis are presented in the right-hand columns of Table 3, illustrated in FIG. 6. Of note, the two CpG islands that were not significantly differentially methylated exhibited broad variability from the minimum to maximum differentials, which could potentially add information on a subset of samples to the classifier, particularly when considered in conjunction with other CpG islands.

Discussion

Identified herein is a CpG island methylation classifier that can be used with oral rinse samples for predicting incident oral and pharyngeal carcinoma with a high degree of accuracy. Several other studies have examined the potential utility of DNA methylation in oral rinse samples for predicting head and neck cancers, but the present findings represent the strongest predictive panel reported to date that was validated in an independent study set, with an impressive adjusted AUC of 0.92 (several studies reporting high sensitivity and/or specificity established methylation cutpoints using the same set of samples that predictive accuracy was tested, leaving them susceptible to issues from overfitting). By applying a rigorous two-stage analysis of Infinium HumanMethylation450 BeadArray data with an agnostic genome-wide assessment that encompassed all annotated CpG islands, including those outside of the gene promoter context, the present study provides contrast to the majority of existing studies, which with few exceptions employ a candidate-gene approach centered on promoter methylation. As such, this study has given rise to novel targets, the majority of which have not been previously reported.

Adding further strength to our findings, 20 of the 22 CpG islands were observed to be differentially methylated in tumor tissue relative to adjacent normal tissue. One of the 2 CpG islands that was not differentially methylated in the TGCA tumors overlaps the promoter region of DKK1, which has been reported to be hypermethylated in head and neck carcinoma, and lower expression has been associated with increased risk of lymph node metastasis and poorer outcome, although other studies report conflicting findings. The other CpG island that was not differentially methylated in the TCGA tumors is associated with the zinc-finger protein ZCCHC14, which is an intriguing locus, as SNPs in that gene have been reported to be associated with nicotine dependence. The CpG island is located in the 3'UTR of ZCCHC14 and overlaps putative microRNA-binding sites for miR-542-3p and miR-615-3p.

The strengths of this study include the relatively large number of cases and controls with oral rinse samples compared to the majority of studies in the current body of literature; use of average CpG island methylation in conjunction with the broad coverage from Infinium HumanMethylation450 BeadArray help to mitigate technical noise that is often an impediment with single locus analysis; and inclusion of oropharyngeal and hypopharyngeal cases along with oral cavity cases broadens the potential applicability of this panel. Additionally, our agnostic, data-driven approach with inclusion of all CpG islands, rather than select, candidate promoter methylation can also be viewed as a strength. This does not diminish the importance of the candidate genes used in prior studies, but embodiments of the present invention now add novel CpG island loci for diagnostic use. The case-control design has the advantage of providing a much larger number of oral and pharyngeal carcinoma cases than would be available using a population-based prospective study. The 22 CpG island methylation panel may be validated as a screening tool in a high-risk population and may also be a tool for use in post-treatment follow-up surveillance for head and neck cancer patients. This platform offers excellent coverage of CpG-dense regions, allowing us to analyze >32,000 distinct CpG islands (as defined by Hidden Markov Model) and remains among the best available options for epigenome-wide analysis of a large number of samples.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. The invention in its broader aspects is, therefore, not limited to the specific details, representative apparatus and method, and illustrative examples shown and described. Accordingly, departures may be made from such details without departing from the spirit or scope of the general inventive concept.

Having described the invention, what is claimed is:

1. A method of detecting methylation of CpG sites in a subject, comprising:
   obtaining a saliva sample from the subject;
   contacting the saliva sample with a set of probes, wherein the set of probes consists of:
      a probe that is complementary to a CpG site having coordinates chr3:15286143-15286274,
      a probe that is complementary to a CpG site having coordinates chr17:77848690-77848800,
      a probe that is complementary to a CpG site having coordinates chr12:118725604-118725889,
      a probe that is complementary to a CpG site having coordinates chr1:154198084-154198623,
      a probe that is complementary to a CpG site having coordinates chr12:28015205-28015607,
      a probe that is complementary to a CpG site having coordinates chr11:2511670-2512178,
      a probe that is complementary to a CpG site having coordinates chr1:8194584-8194818,
      a probe that is complementary to a CpG site having coordinates chr12:110319267-110319654,
      a probe that is complementary to a CpG site having coordinates chr5:161207831-161208167,
      a probe that is complementary to a CpG site having coordinates chr19:5538686-5538939,
      a probe that is complementary to a CpG site having coordinates chr6:25135475-25135786,
      a probe that is complementary to a CpG site having coordinates chr10:134072408-134072501,
      a probe that is complementary to a CpG site having coordinates chr1:10818517-10818704,
      a probe that is complementary to a CpG site having coordinates chr1:1385949-1386143,
      a probe that is complementary to a CpG site having coordinates chr10:53743705-53744974,
      a probe that is complementary to a CpG site having coordinates chr11:20588323-20588561,
      a probe that is complementary to a CpG site having coordinates chr10:134210902-134211265,
      a probe that is complementary to a CpG site having coordinates chr5:10702368-10703458,
      a probe that is complementary to a CpG site having coordinates chr16:85998896-85999172, a probe that is complementary to a CpG site having coordinates chr13:105827274-105827476, a probe that is complementary to a CpG site having coordinates chr5:1010475-1010610, and a probe that is complementary to a CpG site having coordinates chr2:216945117-216945376; and detecting the methylation status of the CpG sites at each of the coordinates by detecting any binding between the probes and the CpG sites.

2. The method of claim 1, further comprising:

extracting DNA from the saliva sample;

bisulfite modifying said extracted DNA sample;

amplifying the extracted DNA sample;

fragmenting said amplified DNA sample;

wherein contacting the saliva sample with the set of probes comprises hybridizing the fragmented DNA sample with the set of probes, wherein each of the set of probes is bound to a substrate; and extending the probe with a single labeled base.

3. The method of claim 2, wherein the amplification step includes whole genome amplification.

4. The method of claim 2, wherein the amplification step includes an isothermal amplification reaction.

5. The method of claim 2, wherein the fragmentation step is an endpoint fragmentation.

6. The method of claim 2, wherein the fragmentation step results in DNA fragments having a length of between 300 base pairs and 600 base pairs.

* * * * *